May 1, 1928.  
F. G. SENTER  
COMPASS BUBBLE BOX  
Filed Sept. 7, 1927
1,668,425
Fig.1,
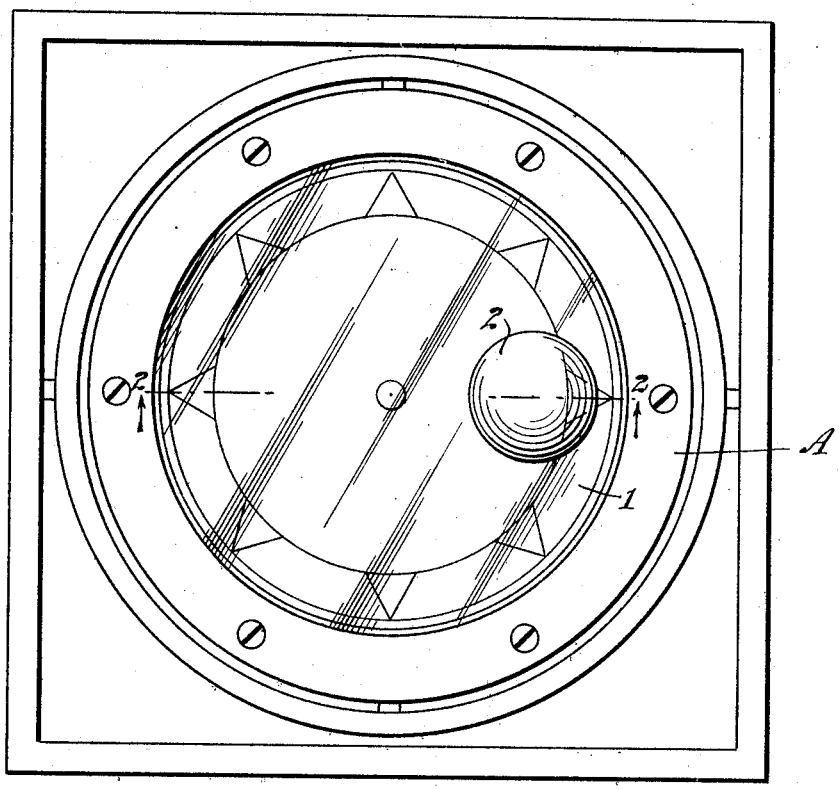
Fig.2.
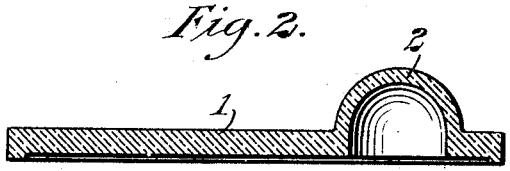
WITNESSES  
Edw. Thorpe,  
S.W. Pooter
INVENTOR  
F. G. Senter  
BY Dunn &Co.  
ATTORNEY Patented May 1, 1928.

UNITED STATES PATENT OFFICE.

FRANK G. SENTER, OF PORTLAND, MAINE.

COMPASS BUBBLE BOX.

Application filed September 7, 1927. Serial No. 218,001.

This invention relates to compass bubble boxes, an object of the invention being to provide on the glass of a compass containing liquid a dome in which any bubble or bubbles which may form will rise and not interfere with the proper reading of the compass.

This bubble box may constitute an integral part of the glass covering the compass or it may be a separate part secured to the glass over an opening in the compass, but in any event I provide a dome or receptacle in a higher plane than the surface of the glass so as to allow any bubbles which may form to rise therein.

I may of course locate the bubble box at any point on the compass, and may construct the same in various ways but I preferably form the same of glass or any other transparent material.

The broad idea of the invention is the provision of what I term a bubble box, properly located on the compass, so that in the use of the compass, if for any cause the liquid fails or ceases to entirely fill the interior space and an air or vacuum bubble is formed, it will naturally seek the highest surface level. This being true, the bubble will rise in the bubble box and will not move about under the surface of the flat glass, inconveniencing the steersman's vision, but is confined at a point unobstructive to same.

With the use of my bubble box mechanical contrivances now in use for overcoming the formation of bubbles may be dispensed with by filling the interior of the compass at the time of manufacture with the liquid heated to the sun's tropical temperature and having the bubble box of adequate size to compensate for the contraction of the liquid when subject to low temperature. Hence the liquid will rise and fall in the bubble box as the temperature varies.

With these and other objects in view, the invention consists in certain novel features of construction and combinations and arrangements of parts, which will be more fully hereinafter described and pointed out in the claims.

In the accompanying drawings—

Figure 1 is a plan view of a compass showing my improved bubble box thereon;

Figure 2 is a view in transverse section on the line 2—2 of Figure 1, and this view may be assumed to disclose a complete glass or only a small section of glass which may be secured over the opening in the main glass of the compass. In other words, in constructing the compass originally it may be provided with a dome-like bubble box or in reconstructing old compasses it is simply necessary to provide an opening in the glass and secure the bubble box thereover by cement or other means.

In the particular construction illustrated, A indicates a compass in which liquid is employed. 1 is a glass covering plate and 2 a dome-like receptacle or compartment which projects upwardly from the glass and communicates with the interior thereof so that the liquid in the compass will fill the dome and if any bubble forms in the liquid it will rise in the dome and not interfere with the proper reading of the compass.

As above stated, this glass 1 may constitute a complete cover for the compass or it may be cemented on the ordinary glass with an opening provided to register with the dome, and I do not wish to be limited to the specific details but desire to cover broadly the idea as expressed. Hence I do not limit myself to the specific details set forth but consider myself at liberty to make such changes and alterations as fairly fall within the spirit and scope of the appended claims.

I claim:

1. In combination with a compass having liquid therein, of a flat transparent cover on the compass having an integral upwardly projecting small dome thereon constituting a bubble box communicating with the interior of the compass.

2. As a new article of manufacture, a flat transparent cover for compass boxes having an integral upwardly projecting dome forming a chamber adapted to communicate with the interior of a compass box.

Signed at Portland, in the county of Cumberland and State of Maine, this second day of September, A. D. 1927.

FRANK G. SENTER.